United States Patent [19]

Martin

[11] Patent Number: 4,916,854
[45] Date of Patent: Apr. 17, 1990

[54] FISHING SPINNER AND METHOD OF MAKING IT

[76] Inventor: Donald G. Martin, 7608 SE. 70th Ave., Portland, Oreg. 97206

[21] Appl. No.: 393,232

[22] Filed: Aug. 14, 1989

[51] Int. Cl.⁴ .............................................. A01K 85/00
[52] U.S. Cl. .................................. 43/42.19; 43/42.16; 43/42.53
[58] Field of Search ................. 43/42.16, 42.19, 42.53, 43/42.38

[56] References Cited

U.S. PATENT DOCUMENTS

| | | | |
|---|---|---|---|
| 2,783,578 | 3/1957 | Moore | 43/42.16 |
| 2,997,804 | 8/1961 | Creason et al. | 43/42.16 |
| 3,137,959 | 6/1964 | Wernett | 43/42.16 |
| 3,670,446 | 6/1972 | Wheeler | 43/42.19 |
| 3,757,454 | 9/1973 | Shurley | 43/42.16 |
| 4,796,378 | 1/1989 | Krueger et al. | 43/42.38 |

*Primary Examiner*—M. Jordan
*Attorney, Agent, or Firm*—Eugene M. Eckelman

[57] ABSTRACT

The spinner is formed of a thin film of a type and gauge that normally retains its shape but at the same time is flexible. The spinner has shrink points on opposite side edges of the rounded end portions which are offset from each other relative to the center of the body portion and which due to the distortion of the material at the shrink points form propeller-like, cupped end portions. In the method of forming the spinner, the blank is cut with the rounded end portions and narrowed body portion. The blank is formed into a propeller-like spinner with cupped blades and a propeller pitch by shrinking the film at points of the rounded end portions which are offset from each other and on opposite sides of the longitudinal center.

8 Claims, 3 Drawing Sheets

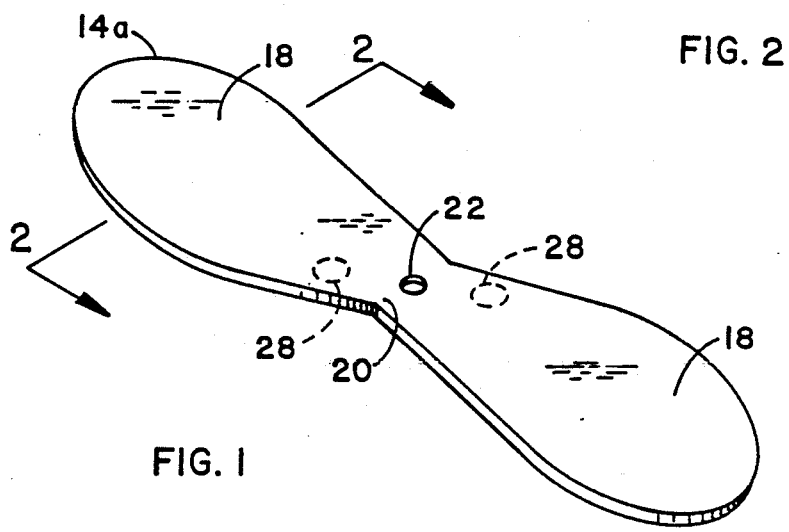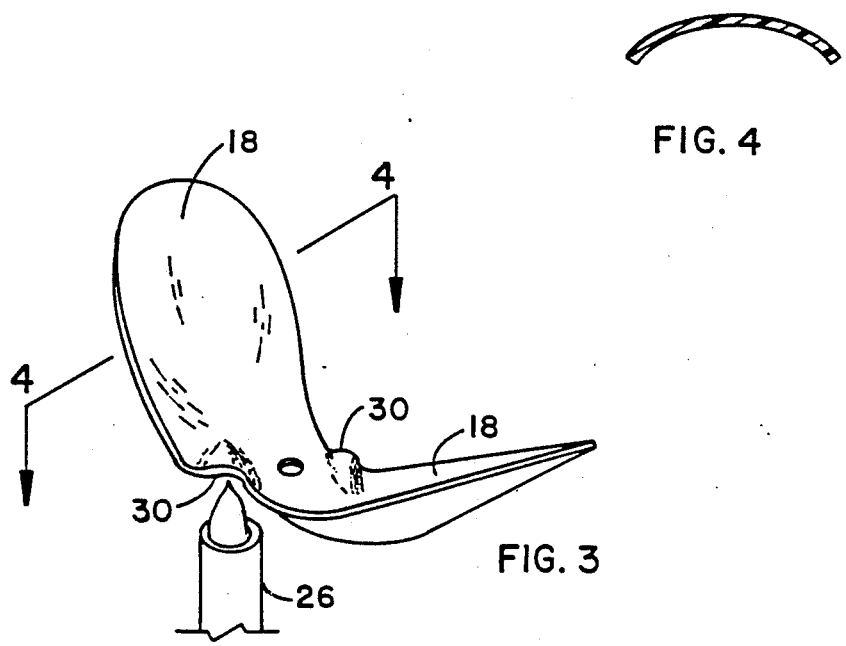

FISHING SPINNER AND METHOD OF MAKING IT

BACKGROUND OF THE INVENTION

This invention relates to new and useful improvements in fishing spinners and to a method of making them.

A desired feature of fishing spinners is that they attract fish, either for the fish to strike the spinner or a bait or other lure adjacent the spinner. Of course, other features are desirable as well. For example, it is desired that spinners do not interfere with the fish taking the bait or lure since such interference can result in the miss of an effective strike. For this purpose, spinners are usually located in spaced relation from the bait or lure. Furthermore, it is desired that spinners be not easily damaged since those that can be damaged by a fish strike, for example, require expensive replacement. Also, as to the overall cost of spinners, it is desirable that they be as inexpensive to manufacture as possible since rigging can be frequently lost.

SUMMARY OF THE INVENTION

A primary object of the invention is to provide a fishing spinner that has improved features of attracting fish, that does not interfere with a fish striking the bait or lure even though the spinner is close to the bait or lure, that ordinarily will not be damaged by a fish strike, that otherwise has a long life because it is substantially indestructible under normal usage, and that is inexpensive to manufacture.

Another object is to provide an improved method of making fishing spinners.

In carrying out the invention, the present spinner has a blade-like member with oppositely extending cupped end portions joined centrally by a narrowed body portion. The spinner is formed of a thin film of a type and gauge that normally retains its shape but at the same time is flexible. The spinner has shrink points on opposite side edges of the rounded end portions which are offset from each other relative to the center of the body portion and which due to the distortion of the material at the shrink points form propeller-like, cupped end portions. In the method of forming the spinner, the blank is cut with the rounded end portions and narrowed body portion. The blank is formed into a propeller-like spinner with cupped blades and a propeller pitch by shrinking the film at points of the rounded end portions which are offset from each other and on opposite sides of the longitudinal center.

The invention will be better understood and additional objects and advantages will become apparent from the following description taken in connection with the accompanying drawings.

BRIEF DESCRIPTION OF THE DRAWINGS

FIG. 1 is a perspective view of a blank of material from which a first form of the present spinner is formed.

FIG. 2 is a cross sectional view taken on the line 2—2 of FIG. 1.

FIG. 3 is a perspective view of the formed spinner blade and showing the shrink step in its formation.

FIG. 4 is a sectional view taken on the line 4—4 of FIG. 3.

DETAILED DESCRIPTION OF PREFERRED EMBODIMENTS

Figure 5:
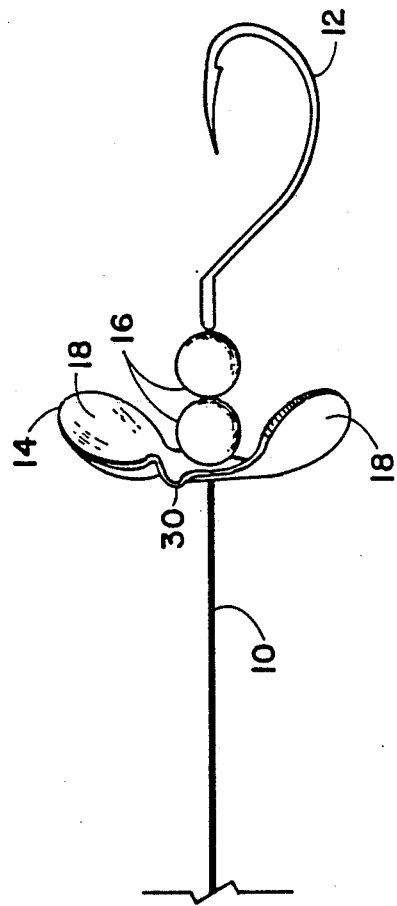
FIG. 5 is a side elevational view of a fish rigging employing the present spinner.

With reference to FIG. 5, a rigging is illustrated of the type conventionally consisting of a leader 10, a fish hook 12, a spinner 14, and other necessary tackle members 16 such as spacers, swivels, etc. The present invention is concerned with the structure of the spinner 14 and the method of forming it.

In a first form of the invention, as shown in FIGS. 1–5, the spinner is formed from a flat blank 14a of plastic film and is cut with rounded end portions joined at the longitudinal center by a narrowed body portion 20. A central bore 22 provides rotative support of the spinner on the leader 10.

The blank 14a comprises a thin film of a type and gauge that normally retains its shape but is flexible. That is, the material is of a type that has a memory and will return to its original shape upon distortion, as will be described more fully hereinafter.

In the formation of the spinner, a concentrated flame 26, such as from a torch, FIG. 3, is applied to one surface at opposite points 28. These two points are shown in phantom in FIG. 1. Such points are adjacent opposite side edges a short distance outwardly on opposite sides of the longitudinal center 22. The flame is applied to the points 28 at sufficient temperature and concentration to heat shrink a small edge portion 30 and cause it to buckle in the direction away from the flame. This heat shrinking process on opposite sides of center causes the end portions 18 to assume a cup shape and to twist in opposite directions in a propeller type pitch. The spinner will when subjected to water pressure rotate efficiently due to the cupped ends and the pitch of these ends.

The material from which the spinner is formed can be plastic or metal. One preferred material comprises a polyester film sold on the market under the trademark Mylar by E. I. DuPont DeNemours & Co. (Inc.) of Wilmington, Del. A preferred gauge is between 0.005 and 0.010 inch. This particular polyester film is self-sustaining in its shape but at the same time is flexible. Such plastic film also has good resistance to creasing, abrasion, shrinking and resistance to soaps, detergents, etc. Furthermore, it is light in weight and thus the spinner will spin freely with minimum water pressure. Both sides of the cupped ends 18 provide reflective surfaces for attracting fish. The spinner may be coated with a reflective material such as by use of an aluminum or colored coating, fluorescent coating, etc. The structure and method of the invention facilitate the making of an inexpensive spinner.

Although the spinner will retain its shape as it is subjected to water pressure, the cup-shaped end portions may bend over slightly but such does not interfere with the spinning characteristics thereof. Also, the flexible nature of the spinner will not interfere with a fish attempting to strike at the hook. That is, rigid spinner blades of appreciable size cannot be located too close to a hook since they block a fish from biting the hook. In the present structure, the spinner can be located closely adjacent the hook since its flexibility will allow it to collapse under the force of the strike. Thus the spinner will not prevent the fish from taking the hook.

Figure 6:
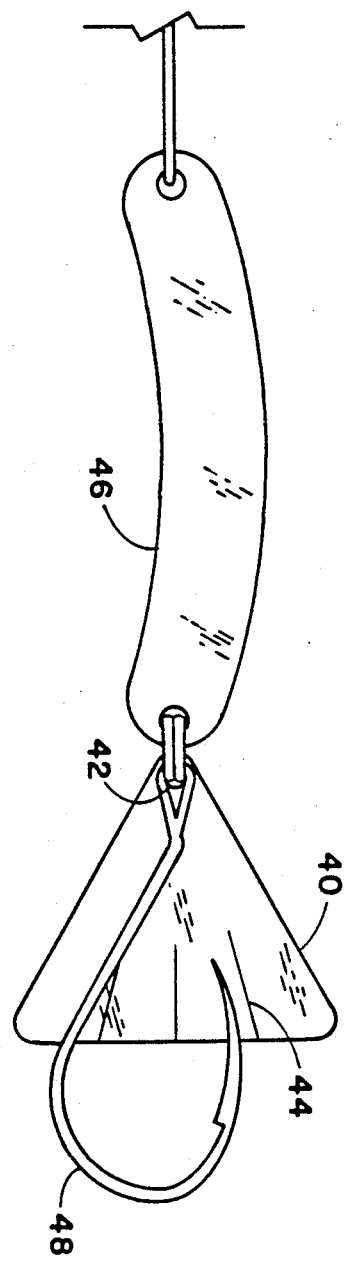
FIG. 6 is a plan view of another form of the invention.

FIG. 6 shows a second embodiment of the invention. This embodiment comprises a blade 40 of triangular shape and having a bore 42 at its forward end for mounting on a leader. This spinner has a common feature with that of FIG. 1 in that it is constructed of a flat blank of plastic film of the type and gauge that normally retains its shape but is flexible. Such preferably comprises a plastic film, as in FIG. 1, and importantly also has the feature that it will collapse under the force of a fish strike. Thus, it can be mounted closely adjacent to the hook and will not prevent the fish from taking the hook.

The blade of FIG. 6 illustrates the feature that the trailing end thereof can be provided with slits 44 that make it even more collapsible when a fish strikes. The blade, although flexible, has sufficient rigidity to maintain its shape in the water. FIG. 6 shows that the blade 40, and also the spinner 14 of FIG. 5, can be used with a spoon 46.

It is to be understood that the forms of my invention herein shown and described are to be taken as preferred examples of the same and that various changes in the shape, size and arrangement of parts may be resorted to without departing from the spirit of my invention, or the scope of the subjoined claims. For example, the spinner may employ more than two blades if desired.

Having thus described my invention, I claim:

1. A propeller-like fishing spinner comprising:
   a body portion having oppositely extending cupped end portions,
   said spinner being formed initially of a flat blank of material of a type and gauge that normally retains its shape but is flexible and will return to its original shape after flexing,
   and shrink points on opposite side edges of said cupped end portions which are offset from each other relative to the center of the body portion and which form a cupped propeller-like shape of said end portions.

2. The fishing spinner of claim 2 including a reflective coating on said blade-like member.

3. The fishing spinner of claim 1 wherein said blank of material comprises polyethylene plastic.

4. The method of forming a propeller-like fishing spinner comprising the steps of:
   forming a flat blank of material of a type and gauge that normally retains its shape but is flexible,
   shaping the blank by rounding end portions which are joined at the longitudinal center of the blank by a narrowed body portion,
   and forming said blank into a propeller-like spinner having cupped blades and a propeller pitch by shrinking said film at points on said rounded ends portion which are offset from each other on opposite sides of the longitudinal center.

5. The method of claim 4 wherein said shrinking step is accomplished by heat.

6. The method of claim 4 wherein said shrinking step is accomplished by a concentrated flame applied to said points.

7. The method of claim 4 including the step of coating said spinner with a reflective material.

8. The method of claim 4 including the step of coating said spinner with a colored reflective material.

* * * * *